Figure 1:
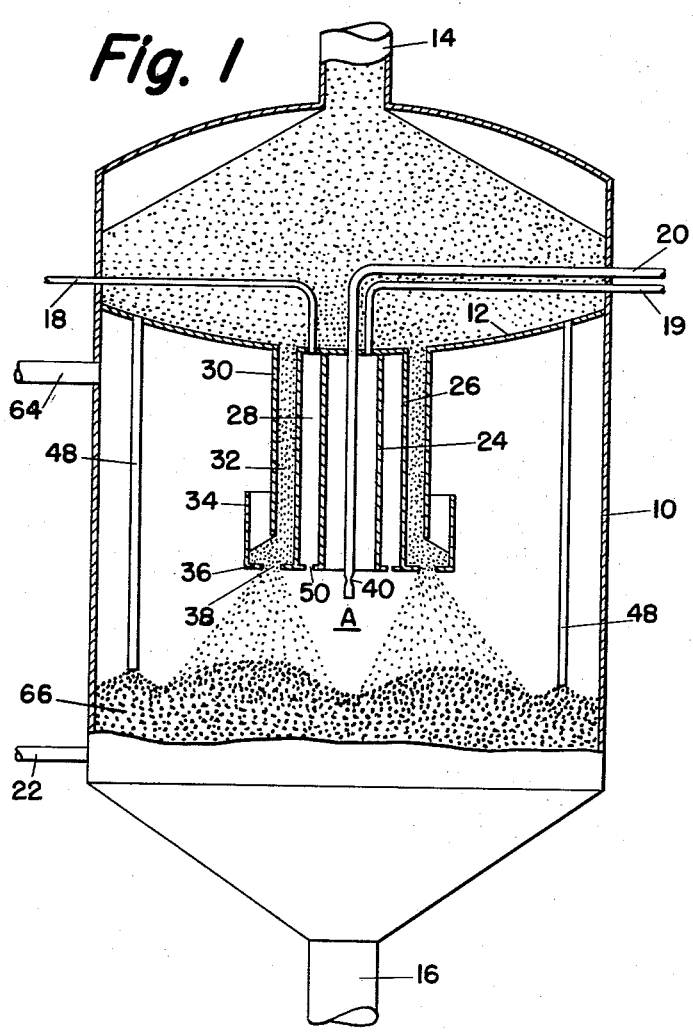

Sept. 13, 1960   W. L. McCLURE   2,952,622
PROCESS AND APPARATUS FOR CONTACTING HYDROCARBONS
WITH A GRANULAR CATALYST
Filed Dec. 12, 1957

INVENTOR.
WILLIAM L. MC CLURE

BY Robert O. Spindle

ATTORNEY

United States Patent Office 2,952,622
Patented Sept. 13, 1960

2,952,622
PROCESS AND APPARATUS FOR CONTACTING HYDROCARBONS WITH A GRANULAR CATALYST

William L. McClure, Toledo, Ohio, assignor to Sun Oil Company, Philadelphia, Pa., a corporation of New Jersey Filed Dec. 12, 1957, Ser. No. 702,399

3 Claims. (Cl. 208—167)

This invention relates to process and apparatus for converting hydrocarbons, and more particularly to means for introducing liquid hydrocarbons and granular solid conversion-supporting material into a conversion vessel.

It is known in the art to contact hydrocarbon charge stocks such as various petroleum fractions with a compact moving bed of granular solid conversion-supporting material, e.g. silica-alumina catalyst, inert heat transfer material, etc., in order to effect conversion of the charge stock. Such processes are well known in the field of cracking of higher molecular weight charge stocks to produce lower molecular weight products such as gasoline, and also in other known processes for hydrocarbon conversion.

In processes where the charge stock is introduced in liquid phase into the conversion zone, it is necessary to provide special means to obtain good contact of the liquid with the granular solids, and good distribution of the liquid throughout the moving bed of solids. In order to promote good contact and distribution, it is known to provide an annular curtain of freely falling solids, into which oil droplets are discharged from a central location. Prior methods for bringing about the contact have been unsatisfactory however in that they do not provide a sufficient spreading of liquid oil and solids over the cross-sectional area of the compact bed onto which the solids fall, and disadvantageous nonuniformities occur in the operation. This lack of sufficient spreading is generally attributable to the fact that the liquid hydrocarbon charge does not have sufficient lateral movement at the time that it comes in contact with the falling solids. The provision of spray nozzles containing small perforations which give the liquid oil a lateral direction of movement at high velocity upon issuing from the perforations, does not constitute a satisfactory solution to the problem, since there is an excessive tendency for coking of the hydrocarbon charge to occur in the nozzle and plug up the small perforations.

According to the present invention, the disadvantages of prior art operation are overcome in a novel manner. A spray nozzle is provided for inert fluid such as steam, the fluid being directed laterally outwardly from a central location into an annular falling curtain of granular conversion-supporting solids. This results in lateral outward deflection of solids in the curtain, with resulting wider distribution of solids over the cross section of the conversion zone. By laterally spraying inert fluid rather than heated hydrocarbons, lateral movement of hydrocarbons and solid particles is obtained without the coking problems which result from passing heated hydrocarbons through a spray nozzle.

Figure 2:
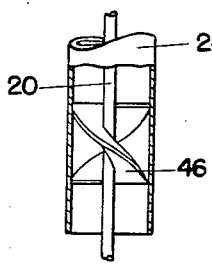

The invention will be further described with reference to the attached drawing, wherein Figure 1 is a sectional elevational view of a conversion vessel according to the invention and Figure 2 is a sectional elevational view of a detail of construction provided in one embodiment of the invention.

Referring to Figure 1, cylindrical conversion vessel 10 has a transverse partition 12 therewithin, an upper inlet 14 for granular solids, a lower outlet 16 for granular solids, inlet conduits 18 and 20 for inert fluid, an inlet conduit 19 for liquid hydrocarbon charge, and an outlet conduit 22 for vaporous conversion products. Within vessel 10 and beneath partition 12 is a downwardly extending conduit 24. Surrounding a portion of conduit 24 is a cylindrical sleeve 26 providing an inner annular passageway 28 between sleeve 26 and conduit 24. Surrounding a portion of sleeve 26 is a second cylindrical sleeve 30, providing an outer annular passageway 32 between sleeves 30 and 26. Surrounding a portion of sleeve 30 is a third cylindrical sleeve 34. Annular closure member 36 communicates with the lower ends of sleeves 26 and 34 and has an annular aperture 38 therewithin. A plurality of orifices 40 in a lower part of conduit 20 provide a nozzle adapted to discharge inert fluid laterally from conduit 20. A plurality of downcomers 48, of which two are shown in the drawing, have their upper ends secured within apertures in transverse partition 12.

In operation, granular solids are introduced through inlet 14 and gravitate as a compact mass through an upper portion of conversion vessel 10. Inert sealing gas, e.g. steam, is introduced into this upper portion through means not shown, such introduction being conventional. Portions of the granular solids are gravitated through the downcomers 48 into a lower portion of conversion vessel 10. Another portion of the solids is gravitated through the outer annular passageway 32, and passes through the aperture 38 in the lower end of that passageway. Beneath the aperture 38, the solids fall freely in an annular curtain.

Hydrocarbon cracking charge in liquid phase, which may if desired be admixed with an inert fluid such as steam, with vapor phase hydrocarbon cracking charge, or with both steam and vapor phase cracking charge, is introduced through line 19 into the upper end of conduit 24, and passes downwardly. Inert fluid such as steam is introduced through line 18 into annular passageway 28, and passes downwardly through passageway 50 into the space therebeneath. The purpose of the steam is to protect metal surfaces from accumulation of excessive coke resulting from impingement and coking of oil droplets thereon.

Inert fluid such as steam is also introduced through line 20 into vessel 10 and is discharged laterally through apertures 40 into liquid oil issuing from conduit 24, thereby causing the oil to move laterally into the falling solids curtain, and causing solid particles in the latter to be deflected laterally outwardly. Not all of the solids are thus deflected, and some fall downwardly in substantially the same path, e.g. straight downward, inward, etc., as they would take in the absence of the laterally moving liquid hydrocarbon. Thus, an advantageous widening of the falling curtain is provided, with the result that the contact material is distributed over a larger portion of the horizontal cross section, including the portion directly beneath the assembly for introduction of liquid hydrocarbon and contact material.

In the operation of the apparatus illustrated in Figure 1, the liquid hydrocarbon charge is atomized prior to its discharge from the lower end of conduit 24. This atomizing is brought about by the rotary motion of the hydrocarbon material caused by passage through the portion of the conduit containing the helical baffle 46 (see Figure 2), and by the presence of vapor phase material, such as steam or hydrocarbon vapors, in admixture with the liquid hydrocarbon material. In the light of the present specification, a person skilled in the art can select proper operating conditions for providing the necessary atomizing of the hydrocarbon charge.

In the absence of the fluid jets from apertures 40, the liquid hydrocarbon would issue from conduit 24 in an atomized annular stream surrounding a low pressure area (A in the drawing). The existence of this low pressure area would counteract in part the tendency of the rotary motion of the liquid stream to throw the liquid out into the annular solids stream. The use of the fluid jets from nozzle 40 largely eliminates this low pressure area and promotes the lateral movement of the liquid into the solids stream.

The granular solids introduced into vessel 10 are at a conversion-supporting temperature, and a portion of the liquid hydrocarbon charge is vaporized upon contact with the solids. The evolved vapors are passed downwardly concurrently with the solids gravitating through the lower portion of vessel 10, and undergo further conversion during such passage. Additional portions of the liquid on the solids are vaporized during passage of solids through the lower portion of vessel 10, and the vaporous conversion products are disengaged by suitable means not shown and removed through line 22 for further processing as well known in the art. The unvaporized liquid on the solid particles is converted to coke, and the solids containing coke deposits are withdrawn through line 16, for regeneration by conventional means not shown.. In the regeneration process, the coke deposits are burned from the solid particles, and the regenerated particles are elevated to a level above vessel 10 and introduced again through line 14 to effect further conversion of hydrocarbon charge.

If desired, the conduit 24 may have secured to its lower end an expanded conduit section as disclosed in applicant's copending United States application Serial No. 686,251, filed September 25, 1957, now abandoned. Such conduit section aids in providing lateral movement of liquid hydrocarbon and granular solids but is not essential according to the invention.

The apertures 40 constitute a nozzle adapted to discharge streams of inert fluid laterally into the hydrocarbons. Any suitable construction of such nozzle can be employed in place of such apertures, nozzles adapted to discharge fluids laterally being well known and generally suitable for use according to the invention. Preferably the nozzle is adapted to discharge fluid either horizontally or in an inclined downward direction. The constrictions through which the fluid passes can be uniformly spaced around the axis of the nozzle. Alternatively, the spacing can be non-uniform, to provide lateral spreading of hydrocarbon and solids in some directions and not in others. Alternatively a single annular constriction can be provided. Any other suitable construction can be employed.

The linear velocity of the vapor or gas in passing through the nozzle outlets is preferably though not necessarily within the approximate range from 10 to 200 feet per second. The amount of vapor or gas discharged is preferably though not necessarily within the approximate range from 0.1 to 1.0 pound per pound of solids in the falling curtain. Generally, relatively low velocities are employed with relatively high fluid rates, and vice versa. The preferred inert fluid is steam but any other suitable vapor or gas can be employed.

In Figure 2, an embodiment is illustrated wherein helical baffles 46 are provided within conduit 24 in order to impart rotary motion to the hydrocarbons passing through the conduit. The baffles are preferably secured to the outer wall surface of conduit 20 and have their outer edges in contact with or secured to the inner wall of conduit 24. The rotary motion helps to atomize the hydrocarbons and also to impart lateral outward motion to the hydrocarbons after discharge from the lower end of conduit 24. The use of such baffles is preferred but not essential. In place of the helical baffles 46 shown in Figure 2, a tangential horizontal inlet for the liquid hydrocarbon charge can be employed to provide rotary motion and aid in atomizing. Any other suitable means for imparting rotary motion can be employed.

The following example illustrates the invention:

In operation generally similar to that illustrated in the drawing, the rate of flow of catalyst through the orifice 38 is about 150 tons per hour at 1100° F. Gas oil cracking charge is introduced through line 19 at 450° F. and a rate of 72 barrels per hour, admixed with steam at a rate of 700 pounds per hour. The gas oil is partly in liquid and partly in vapor phase. Steam at 450 p.s.i.g. is introduced through line 20 and nozzle 40 at about 100 pounds per hour. The average pressure in the space through which the annular solids curtain falls is about 12 to 15 p.s.i.g. The linear velocity of the steam in passing through the apertures 40 is about 100 feet per second. The steam introduced through the apertures improves the contacting of charge oil with catalyst and the distribution of catalyst over the reactor cross section.

The invention has been described previously with regard to a conversion vessel containing a single assembly for provision of an annular falling curtain of solids and a central stream of liquid hydrocarbon charge. It is to be understood that any suitable number of such assemblies can be employed in a single reaction vessel. Preferably the assemblies are spaced uniformly over the cross section of the vessel, in order that solids and charge from the respective assemblies are distributed over substantially equal portions of the cross-sectional area.

The hydrocarbon charge introduced in liquid phase into the conversion zone can, according to the invention, be introduced in admixture either with vapor phase hydrocarbon charge, or with an inert fluid such as steam. If desired, vapor phase hydrocarbon charge can be separately introduced into the conversion zone. Thus, for example, referring to Figure 1, vapor phase hydrocarbon charge can be introduced through line 64, and passed downwardly through the solids bed 66, the products of conversion of the vapor phase charge being withdrawn through line 22 together with the products of conversion of the liquid phase charge.

The present invention provides advantageous distribution of liquid hydrocarbon charge over the cross-sectional area of the conversion vessel. Together with this result, greater lateral distribution of granular solids over the cross-sectional area of the vessel is also obtained. It is undesirable to provide too great lateral displacement of the solids in the falling annular curtain, but it is necessary to provide at least a minimum extent of such lateral displacement in order to obtain the benefits of good contact and distribution. The present invention provides an extent of lateral displacement which is optimum from the standpoint of good contact and good distribution.

It is important to distribute liquid hydrocarbon charge over the cross-sectional area of the conversion vessel in order to avoid uneven temperature distribution. Good liquid distribution is also required in order to avoid excessive concentration of liquid in localized portions of the conversion vessel, e.g. directly beneath the conduit for introduction of liquid hydrocarbon.

If desired, means can be provided to prevent migration of liquid hydrocarbon droplets to the wall of the conversion vessel. Such means are well known in the art, as illustrated for example in United States Patent No. 2,492,998, issued January 3, 1950, to R. C. Lassiat; United States Patent No. 2,492,999, issued January 3, 1950, to R. C. Lassiat; and United States Patent No. 2,493,035, issued January 3, 1950, to R. T. Savage.

It is also within the scope of the invention to provide, if desired, means for directing the annular curtain of falling solids inwardly, as disclosed in United States Patent No. 2,766,187, issued October 9, 1956, to E. V. Bergstrom. Any other suitable means for directing solids inwardly, such as a stream or streams of deflecting inert fluid directed from outside the solids stream toward the axis, can be employed. It is also within the scope of the invention to provide, if desired, means for providing a plurality of concentric annular falling curtain of solids, as disclosed in United States Patent No. 2,770,583, issued November 13, 1956, to J. H. Haddad.

The present invention is applicable generally to hydrocarbon conversion processes involving contact of liquid hydrocarbon material with granular solid contact material. Cracking, coking, reforming, desulfurization processes, etc. are typical of the types of conversion to which the present invention may be applied. A particularly beneficial application of the invention is in hydrocarbon cracking processes to produce gasoline from higher molecular weight charge stocks. Typical operation in such processes involves introducing heated contact material, at a temperature for example within the approximate range from 800° F. to 1200° F., into a cracking zone, and introducing hydrocarbon charge into the cracking zone at a temperature within the approximate range from 600° F. to 900° F. The contact material withdrawn from the cracking zone is introduced into a regeneration zone, wherein it is contacted with free-oxygen containing gas under conditions suitable for oxidation of carbonaceous materials deposited on the solids during the cracking operation. It is then customary to elevate the solids by suitable known means to a position above the cracking vessel, and gravitate the solids as a compact mass through the cracking vessel again.

Natural or activated clays, bauxite, activated alumina, synthetic silica-alumina catalyst, etc. are examples of catalyst materials to which the invention is applicable. However any of the well known granular conversion catalysts can be employed. Zirkite, mullite, corhart, etc. are examples of refractory heat transfer materials which can be employed as conversion-supporting solid materials according to the invention. However, any of the other well known inert refractory materials for use in hydrocarbon conversion processes can also be employed. The particle size of the granular solid material employed in the process according to the invention is generally within the approximate range from 3 to 20 mesh on the United States Sieve Series scale.

The nozzle provided by the apertures 40 can be located at any horizontal level between the upper and lower extremities of the annular curtain of falling solids. If located near the upper extremity, the gas emitted from the apertures engages liquid oil emerging from conduit 24 and causes the oil to move laterally into the falling solids curtain. If the nozzle is located substantially beneath the upper extremity of the curtain, for example at a level within the approximate range from one-quarter to three-quarters of the vertical distance from the upper extremity of the solids curtain to the lower extremity, and means for imparting rotary motion to the liquid oil or other means adapted to cause lateral movement of the liquid oil are employed, the engagement of gas emitted from the nozzle with liquid oil prior to engagement of the latter with solids is usually substantially reduced, as a result of the operation of such means on the liquid oil, causing it to be engaged with solids at a level above the level of emission of the gas.

The invention claimed is:

1. Process for converting hydrocarbons which comprises: passing atomized liquid hydrocarbon downwardly through an introduction zone; discharging said hydrocarbon from said zone into an expanded zone therebeneath as a substantially unobstructed annular fluid stream; passing granular conversion-supporting solid contact material downwardly as a compact mass through an annulus surrounding said introduction zone and then through an annular constricted zone and therebeneath as a falling annular stream; passing inert fluid material through a second introduction zone to a position within said fluid stream in said expanded zone; spraying said inert fluid material laterally from said position, thereby to direct liquid hydrocarbon laterally away from the axis of the first named introduction zone and into said falling annular stream; collecting solids from the falling annular stream on a gravitating compact bed in a conversion zone therebeneath, and separately removing solids and fluid conversion products from the conversion zone.

2. Process according to claim 1 wherein said liquid hydrocarbon is passed downwardly with rotary motion through the first named introduction zone.

3. Apparatus for converting hydrocarbons which comprises: a conversion vessel; a downwardly extending conduit therein having a substantially unobstructed lower end; means for introducing fluid hydrocarbon material into an upper portion of the conduit; means located within said downwardly extending conduit to impart rotary motion to the hydrocarbon passing therethrough; means providing an annular, downwardly extending conduit for granular solid contact material surrounding the first named downwardly extending conduit and having an annular constriction at the lower end thereof; a third conduit adapted to convey inert fluid material to a position beneath the lower end of the first named downwardly extending conduit and substantially on the axis of said first named downwardly extending conduit; a spray nozzle at the discharge end of said third conduit; said vessel containing space for lateral movement of an annular stream of solids falling beneath said constriction and space for downward travel of a compact bed of solids beneath the falling stream; and means for separately removing solids and fluid conversion products from said vessel.

References Cited in the file of this patent

UNITED STATES PATENTS

| 2,492,999 | Lassiat | Jan. 3, 1950 |
| 2,493,036 | Savage et al. | Jan. 3, 1950 |
| 2,556,514 | Bergstrom | Jan. 12, 1951 |
| 2,574,489 | Lassiat et al. | Nov. 13, 1951 |
| 2,766,187 | Bergstrom | Oct. 9, 1956 |
| 2,786,801 | McKinley | Mar. 26, 1957 |

FOREIGN PATENTS

| 661,254 | Great Britain | Nov. 21, 1951 |
| 868,202 | Germany | Feb. 23, 1953 |